United States Patent [19]
Caliboso et al.

[11] Patent Number: 5,668,710
[45] Date of Patent: Sep. 16, 1997

[54] CHARGE PUMP CIRCUIT HAVING INDEPENDENT INVERTED AND NON-INVERTED TERMINALS

[75] Inventors: Amado A. Caliboso, Sunnyvale; Ali Tasdighi, San Jose; John P. Tero, Saratoga, all of Calif.

[73] Assignee: TelCom Semiconductor, Inc., Mountain View, Calif.

[21] Appl. No.: 674,955

[22] Filed: Jul. 3, 1996

[51] Int. Cl.$^6$ .................................................. H02M 3/18
[52] U.S. Cl. .................................................. 363/60; 363/59
[58] Field of Search ........................ 363/59, 60; 323/536; 307/110

[56] References Cited

U.S. PATENT DOCUMENTS

| | | | |
|---|---|---|---|
| 4,777,577 | 10/1988 | Bingham et al. | 363/60 |
| 4,807,104 | 2/1989 | Floyd et al. | 363/59 |
| 4,888,677 | 12/1989 | Grimm et al. | 363/60 |
| 4,897,774 | 1/1990 | Bingham et al. | 363/61 |
| 5,306,954 | 4/1994 | Chan et al. | 307/110 |
| 5,339,236 | 8/1994 | Tamagawa | 363/59 |
| 5,416,691 | 5/1995 | Croughwell | 363/60 |
| 5,546,296 | 8/1996 | Savignac et al. | 363/60 |

*Primary Examiner*—Matthew V. Nguyen
*Attorney, Agent, or Firm*—Skjerven, Morrill, MacPherson, Franklin, & Friel, LLP; Patrick T. Bever

[57] ABSTRACT

A charge pump circuit including two transfer capacitors, two reservoir capacitors and a plurality of switches. The transfer capacitors are charged to Vin when the charge pump circuit is in a first operating state, the transfer capacitors are connected in a first series arrangement to apply a +2 Vin charge to one of the reservoir capacitors when the charge pump circuit is in a second operating state, and the transfer capacitors are connected in a second series arrangement to apply a −2 Vin charge to the other of the reservoir capacitors when the charge pump circuit is in a third operating state. A control circuit is provided to control the plurality of switches such that the charge pump circuit enters the first through third operating states is a predetermined sequence.

10 Claims, 4 Drawing Sheets

CHARGE PUMP CIRCUIT HAVING INDEPENDENT INVERTED AND NON-INVERTED TERMINALS

BACKGROUND OF THE INVENTION

1. Field of the Invention

The present invention pertains to a charge pump power supply for generating bipolar output voltages greater in magnitude than a single unipolar input voltage.

2. Description of the Prior Art

Digital interface circuits, such as RS-232 transmitter/receiver units, typically require a bipolar supply voltage of ±10 or ±15 volts. These interface circuits typically utilize charge pump circuits to convert a 5 volt unipolar supply voltage into the required bipolar supply voltage.

FIG. 1 is a simplified schematic diagram of a charge pump circuit disclosed in U.S. Pat. No. 4,897,774. Charge pump circuit 50 has a first input terminal connected to a power supply 12, which provides a supply voltage Vcc, and a second input terminal connected to ground (GND). Charge pump circuit 50 includes two voltage transfer capacitors 10 and 24, two reservoir capacitors 22 and 34, an inverted output terminal 38 and a non-inverted output terminal 40, all of which being selectively interconnected through switches 14, 16, 18, 20, 23, 26, 30 and 32.

Operation of charge pump circuit 50 is divided into two phases. In a first phase, voltage source 12 is connected across transfer capacitor 10, and the voltage on reservoir capacitor 22 is applied to transfer capacitor 24. During a second phase, the voltage on the transfer capacitor 10 is transferred to the reservoir capacitor 22, and the voltage on transfer capacitor 24 is transferred to reservoir capacitor 32.

FIGS. 2 and 3 show effective circuits formed during the first and second phases of operation.

As shown in FIG. 2, during the first phase of operation, switches 14 and 16 are closed and switches 18 and 20 are opened, thereby charging transfer capacitor 10 using voltage source 12. In addition, switches 23 and 26 are closed and switches 30 and 32 are opened, thereby charging transfer capacitor 24 to the voltage level of reservoir capacitor 22.

As shown in FIG. 3, during the second phase, switches 14 and 16 are open and switches 18 and 20 are closed, thereby connecting voltage source 12 in series with transfer capacitor 10. The sum of these voltages is applied across reservoir capacitor 22, and provides a voltage of approximately +2 Vcc at non-inverted output terminal 40.

In addition, during the second phase, switches 26 and 23 are opened and switches 30 and 32 are closed. In this state, the voltage across transfer capacitor 24 is applied across reservoir capacitor 34, and the positive end of transfer capacitor 24 is connected to ground through switch 32. The negative end of transfer capacitor 24 is connected to the side of reservoir capacitor 34, which generates a negative voltage at inverted terminal 38. One of ordinary skill in the art understands that a small "sag", or voltage loss, occurs when the positive voltage of reservoir capacitor 22 is converted into the negative voltage at inverted output terminal 38. Therefore, assuming the voltage level at non-inverted terminal 40 is +2 Vcc, the magnitude of the voltage level at inverted terminal 38 will be somewhat less than 2 Vcc (that is, between 0 and −2 Vcc).

A problem associated with the above-mentioned charge pump circuit 50 is that, when a large load is connected to the non-inverted output terminal 40, the negative voltage level at the inverted output terminal 38 can drop below the minimum voltage level required by the interface circuit. As explained above, reservoir capacitor 22 is used to charge transfer capacitor 24, which in turn in used to generate the negative voltage at inverted output terminal 38. When the load connected to non-inverted output terminal 40 is small, the voltage at non-inverted output terminal 40 can approach the ideal value of +2 Vcc. However, when the load on non-inverted output terminal 40 increases, the voltage level at non-inverted output terminal 40 can fall significantly below +2 Vcc (although still above a required minimum voltage). This reduced voltage is then subjected to "sag" during the conversion to the inverted voltage applied to inverted output terminal 38. As a result, the magnitude of the voltage level at the inverted terminal 38 can fall below the required minimum voltage, even though the voltage level at the non-inverted terminal 40 is equal to or greater than the required minimum voltage. When this occurs, the interface circuit incorporating charge pump circuit 50 fails to operate properly.

SUMMARY OF THE INVENTION

In accordance with the present invention, a charge pump circuit is provided for generating a bipolar voltage output having a magnitude which is multiple times that of a unipolar voltage source, wherein each of a plurality of transfer capacitors are charged in parallel by the unipolar voltage source. These transfer capacitors are then connected in series to refresh the inverted and non-inverted reservoir capacitors of the charge pump circuit. Unlike the prior art charge pump circuit, the inverted and non-inverted reservoir capacitors are refreshed directly by the transfer capacitors, thereby avoiding the problems described above with respect to the prior art.

In accordance with one embodiment of the present invention, the charge pump circuit includes first and second transfer capacitors having first terminals respectively connectable to the unipolar voltage source through first and second switches, and second terminals respectively connectable to ground through third and fourth switches. A first node is located on a conductive path extending between the first terminal of the first transfer capacitor and the first switch, a second node is located between the second terminal of the second transfer capacitor and the fourth switch, a third node is located between the first terminal of the second transfer capacitor and the second switch, and a fourth node is located between the second terminal of the first transfer capacitor and the third switch. The first node is connectable to the second node through a fifth switch, and the third node is connectable to ground through a sixth switch. With this arrangement, the first and second transfer capacitors are selectively connected in parallel with the unipolar voltage source during a transfer capacitor charging state (operating state "a") of the charge pump circuit by closing the first through fourth switches and opening the fifth and sixth switches.

In addition, the charge pump circuit includes a first (non-inverted) reservoir capacitor having a first terminal connectable to the third node through a seventh switch, and a second terminal connected to ground. A non-inverted terminal of the charge pump circuit is located between the first terminal of the first reservoir capacitor and the seventh switch. The charge pump circuit also includes a second (inverted) reservoir capacitor having a first terminal connectable to the fourth node through a eighth switch, and a second terminal connected to ground. An inverted terminal of the charge pump circuit is located between the first terminal of the second reservoir capacitor and the eighth

3 switch. With this arrangement, the first and second transfer capacitors are connected in series to refresh the first reservoir capacitor by closing the third, fifth and seventh switches and opening the remaining switches (operating state "b"). Conversely, the first and second transfer capacitors refresh the second reservoir capacitor by closing the fifth, sixth and eighth switches and opening the remaining switches (refresh state "c").

Finally, the charge pump circuit includes a control circuit for generating control signals which are applied to the gates of the first through eighth switches to open and close these switches such that the charge pump circuit enters operating states "a", "b" and "c" in a predetermined sequence.

In accordance with another embodiment of the present invention, the control circuit generates switch control signals such that the charge pump circuit enters the charging state "a" before each of the refresh states "b" and "c". That is, the control circuit generates switch control signals such that the charge pump circuit enters the operating states "a", "b" and "c" according to the following four-step repeating sequence (1):

(1) a→b→a→c

In accordance with the four-step sequence (1), the transfer capacitors are charged after each refresh state, thereby assuring a uniform voltage magnitude at the inverted and non-inverted terminals of the charge pump circuit.

In accordance with another embodiment of the present invention, the control circuit controls the switches according with the following six-step repeating sequence (2):

(2) a→b→c→a→c→b

In accordance with the six-step sequence (2), the reservoir capacitors are charged more often than in sequence (1). Further, because the particular refresh state (inverted terminal or non-inverted terminal) following the charging state is alternated after each charging state, voltage level magnitudes at the reservoir capacitors are normalized (averaged) to reduce the effect of charge transfer errors due the capacitances of the reservoir capacitors and parasitic resistance mismatches.

BRIEF DESCRIPTION OF THE DRAWINGS

These and other features, aspects, and advantages of the present invention will become better understood with regard to the following description, appended claims, and accompanying drawings, where:

4

DETAILED DESCRIPTION

Figure 4:
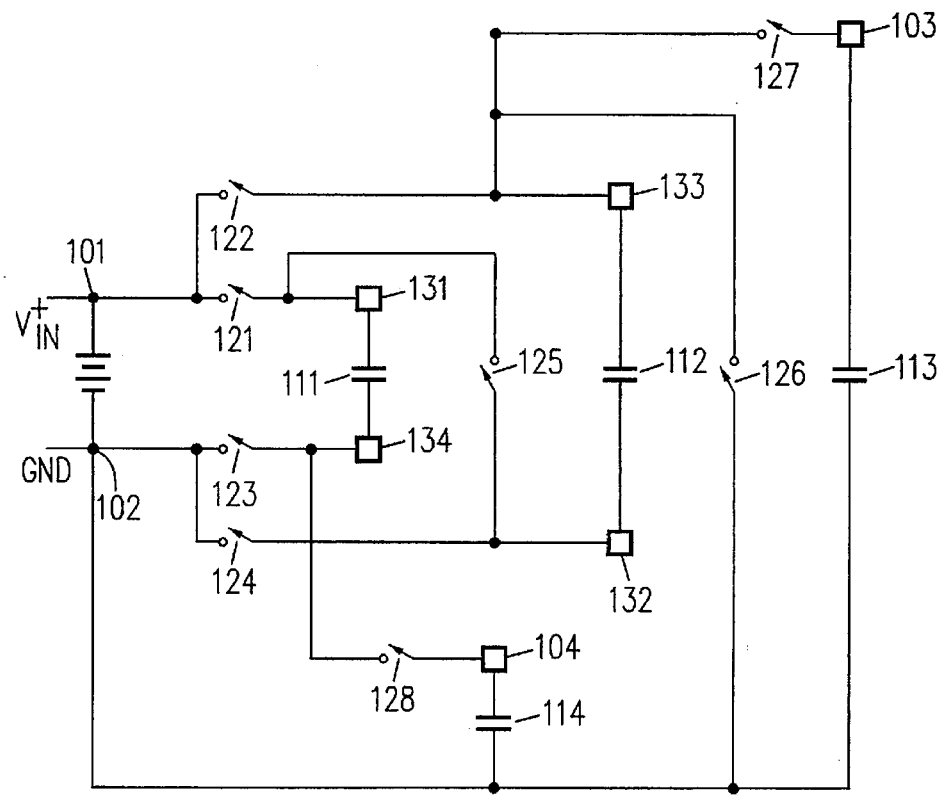
FIG. 4 shows a simplified schematic diagram of a charge pump circuit according to the present invention.

FIG. 4 shows a simplified schematic diagram of a charge pump circuit 100 according to an embodiment of the present invention.

Charge pump circuit 100 has an input terminal 101 and a ground terminal 102. Input terminal 101 is connected to the positive terminal of a unipolar supply voltage +Vin, and ground terminal 102 is connected to ground (Gnd). Charge pump circuit 100 also has a non-inverted (first) output terminal 103 and an inverted (second) output terminal 104. During normal operation, non-inverted output terminal 103 is maintained at a voltage level which is substantially equal to +2 Vin, and inverted output terminal 104 is maintained at a voltage level which is substantially equal to −2 Vin.

Charge pump circuit 100 includes first and second transfer capacitors 111 and 112. First transfer capacitor 111 has a first terminal connectable to input terminal 101 through a first switch 121, and second transfer capacitor 112 has a first terminal connectable to input terminal 101 through a second switch 122. First transfer capacitor 111 also has a second terminal connectable to ground terminal 102 through a third switch 123, and second transfer capacitor 112 has a second terminal connectable to the ground terminal 102 through a fourth switch 124. Although two transfer capacitors are shown in FIG. 4, it is recognized that more than two transfer capacitors may be included in a charge pump circuit of the present invention.

Charge pump circuit 100 defines four nodes 131 through 134 which are referred to in the following description. A first node 131 is located along the conductive segment extending between the first terminal of transfer capacitor 111 and switch 121. A second node 132 is located between the second terminal of transfer capacitor 112 and switch 124. First node 131 and second node 132 are connectable through a fifth switch 125. A third node 133 is located between the first terminal of transfer capacitor 112 and switch 122. Third node 133 is connectable to ground terminal 102 through a sixth switch 126, and to non-inverted output terminal 103 through a seventh switch 127. A fourth node 134 is located between the second terminal of transfer capacitor 111 and switch 123. Fourth node 134 is connectable to inverted output terminal 104 through an eighth switch 128.

Charge pump circuit 100 also includes two reservoir capacitors 113 and 114. First reservoir capacitor 113 includes a first terminal connectable to node 133 through seventh switch 127, and a second terminal connected to ground terminal 102. Non-inverted output terminal 103 is located between the first terminal of first reservoir capacitor 113 and seventh switch 127. Second reservoir capacitor 114 includes a first terminal connectable to node 134 through eighth switch 128, and a second terminal connected to ground terminal 102. Inverted output terminal 104 is located between the first terminal of second reservoir capacitor 114 and eighth switch 128.

Charge pump circuit 100 generates a voltage level substantially equal to +2 Vin on non-inverted output terminal 103 and a voltage level substantially equal to −2 Vin on inverted output terminal 104 by transferring charges from transfer capacitors 111 and 112 to reservoir capacitors 113 and 114. This transferring process is performed by controlling (opening and closing) the switches 121 through 128 such that charge pump circuit 100 enters predefined operating states in a predetermined sequence. By controlling this sequence of operating states (discussed below), the voltages at output terminals 103 and 104 are maintained at +2 Vin and −2 Vin, respectively.

Figure 5:
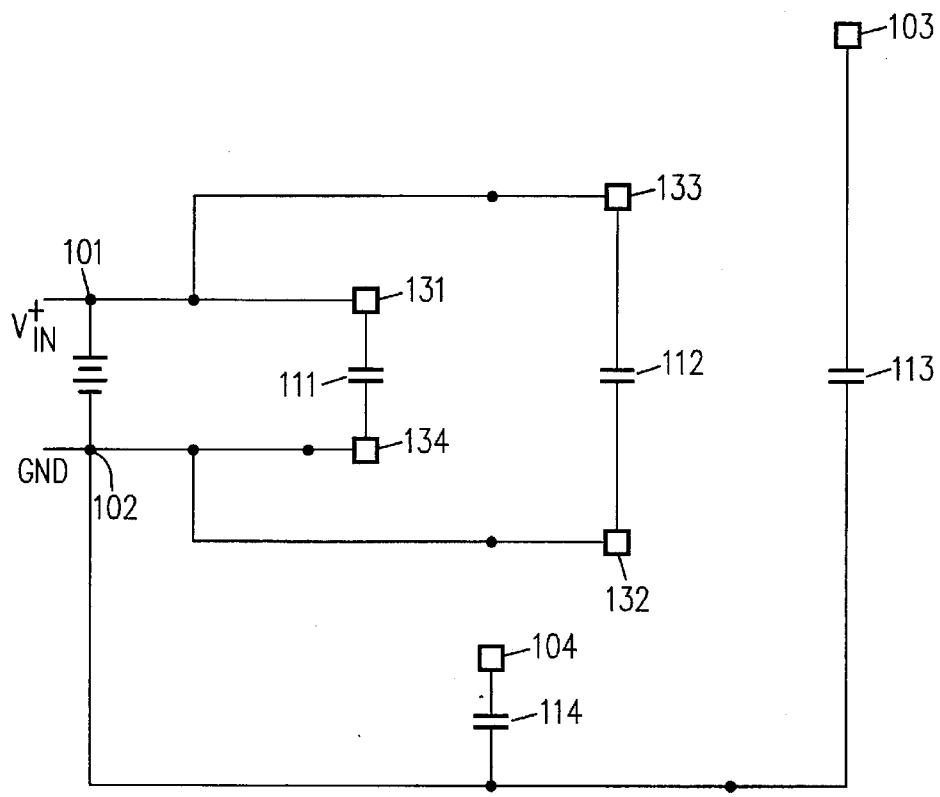
FIG. 5 shows a simplified schematic diagram of an equivalent circuit formed during first and third phases of operation of the charge pump circuit shown in FIG. 4.
Figure 6:
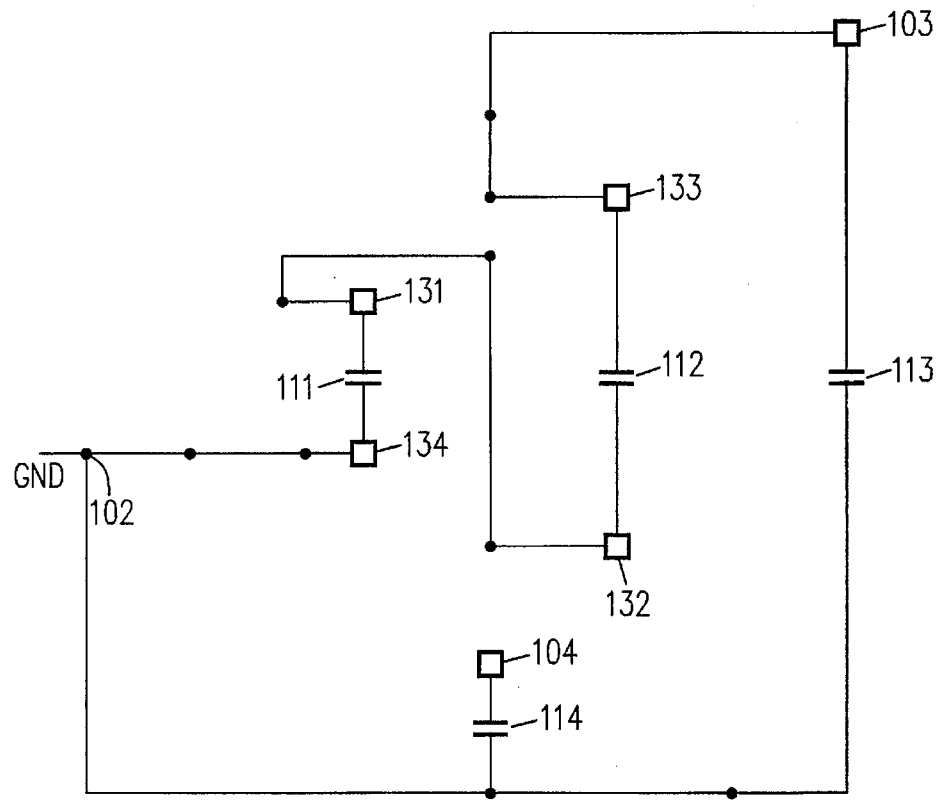
FIG. 6 shows a simplified schematic diagram of an equivalent circuit formed during a second phase of operation of the charge pump circuit shown in FIG. 4.
Figure 7:
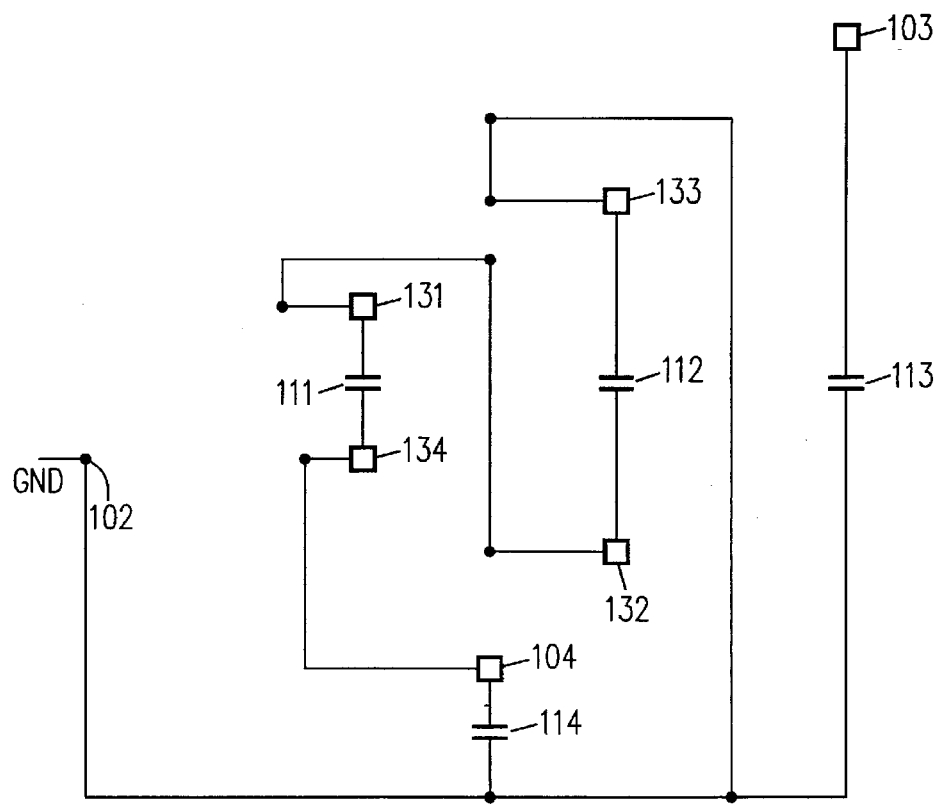
FIG. 7 shows a simplified schematic diagram of an equivalent circuit formed during a fourth phase of operation of the charge pump circuit shown in FIG. 4.

FIGS. 5-7 show the equivalent circuits formed during the three operating states of charge pump circuit 100. To enter these operating states, each of switches 121 through 128 are selectively opened or closed, thereby forming the equivalent circuits shown in FIGS. 5-7.

FIG. 5 shows an equivalent circuit of charge pump circuit 100 during a first (charging) operating state (hereafter referred to as operating state "a"). In operating state "a", switches 121, 122, 123 and 124 are closed and switches 125, 126, 127 and 128 are opened. This connects transfer capacitors 111 and 112 in parallel with the voltage supply, thereby charging each of the transfer capacitors 111 and 112 to the supply voltage potential +Vin. In operating state "a", non-inverted output terminal 103 is maintained at +2 Vin by first reservoir capacitor 113, and inverted output terminal 104 is maintained at −2 Vin by second reservoir capacitor 114.

FIG. 6 shows a second operating state in which non-inverted reservoir capacitor 113 is refreshed by transfer capacitors 111 and 112 (hereafter referred to as operating state "b"). During operating state "b", switches 123, 125 and 127 are closed and switches 121, 122, 124, 126 and 128 are open. As shown, this connects transfer capacitors 111 and 112 in series such that the second terminal of transfer capacitor 111 is connected to ground, the first terminal of transfer capacitor 111 is connected to the second terminal of transfer capacitor 112, and the first terminal of transfer capacitor 112 is connected to non-inverted output terminal 103. In other words, series-connected transfer capacitors 111 and 112 are connected in parallel with non-inverted reservoir capacitor 113. Because transfer capacitors 111 and 112 are each charged to Vin, operating state "b" transfers a +2 Vin voltage level to reservoir capacitor 113, thereby producing a +2 Vin voltage level at output terminal 103.

FIG. 7 shows a third operating state in which inverted reservoir capacitor 114 is refreshed by transfer capacitors 111 and 112 (hereafter referred to as operating state "c"). During operating state "c", switches 125, 126 and 128 are closed, and switches 121, 122, 123, 124 and 127 are opened. Similar to refresh state "b", transfer capacitors 111 and 112 are connected in series in refresh state "c". However, in refresh state "c", transfer capacitors 111 and 112 are connected in a reversed series arrangement with the first terminal of transfer capacitor 112 connected to ground, the second terminal of transfer capacitor 112 connected to the first terminal of transfer capacitor 111, and the second terminal of transfer capacitor 111 connected to inverted output terminal 104. Because transfer capacitors 111 and 112 are charged to Vin, operating state "c" transfers a −2 Vin voltage level to reservoir capacitor 114, thereby producing a −2 Vin voltage level at output terminal 104.

Referring again to FIGS. 5-7, each of the non-inverted and inverted output terminals 103 and 104 are isolated during two of the three operating states "a", "b" and "c" to maintain the desired output voltage levels. For example, non-inverted output terminal 103 is isolated from transfer capacitors 111 and 112 by switch 127 during the charging state "a" (FIG. 5) and the second refresh state "c" (FIG. 7). This prevents any variation from +2 Vin at non-inverted output terminal 103 from affecting the voltage level at inverted output terminal 104. Similarly, inverted output terminal 104 is isolated from transfer capacitors 111 and 112 by switch 128 during the first and second phases of operation. This prevents any variation from −2 Vin at inverted output terminal 104 from affecting the voltage level at non-inverted output terminal 103.

It is noted that the power supply potential Vin applied at input terminal 101 is disconnected from all of transfer capacitors 111 and 112 and reservoir capacitors 113 and 114 during the refresh operating states "b" and "c".

Figure 1:
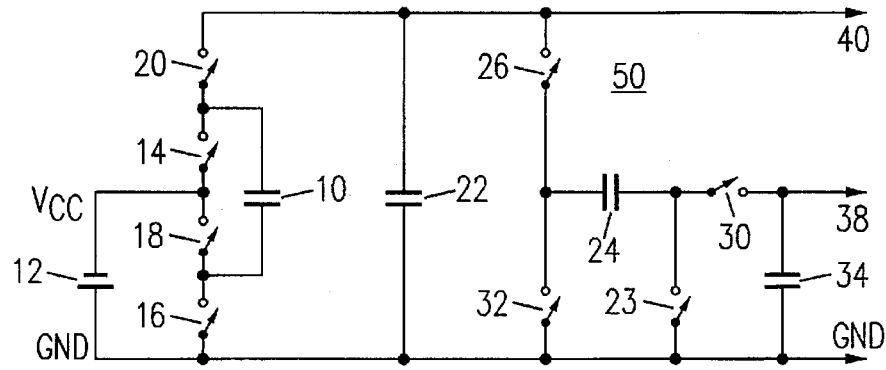
FIG. 1 shows a simplified schematic diagram of a prior art charge pump circuit.
Figure 2:
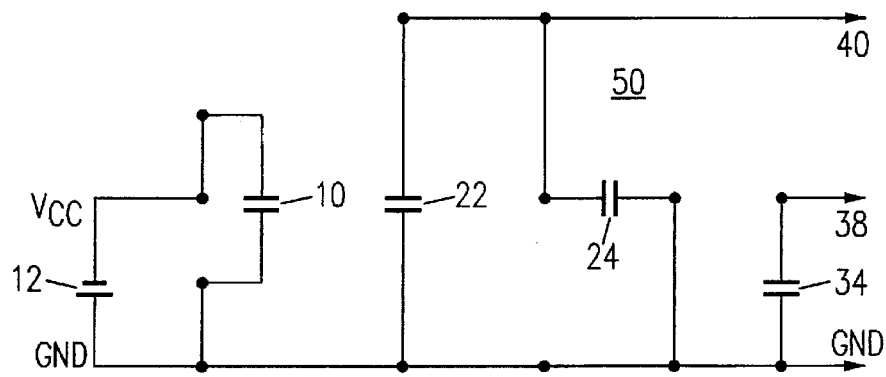
FIG. 2 shows a schematic diagram of an equivalent circuit formed during a first phase of the charge pump circuit shown in FIG. 1.
Figure 3:
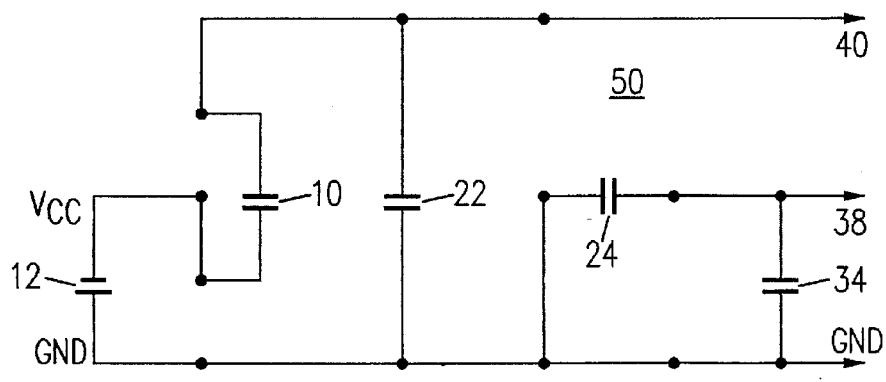
FIG. 3 shows a schematic diagram of an equivalent circuit formed during a second phase of the charge pump circuit shown in FIG. 1.
Figure 8:
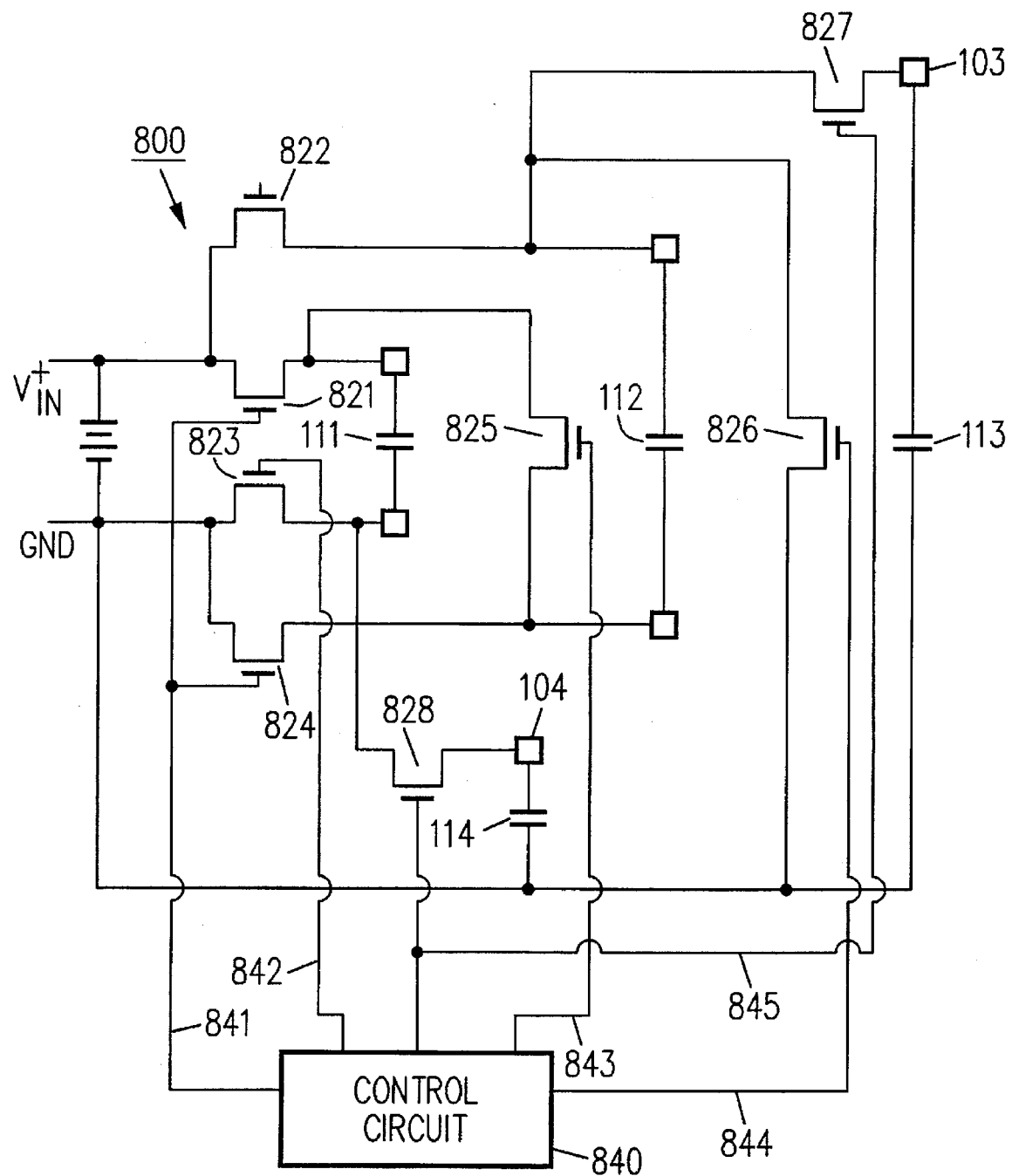
FIG. 8 showing a simplified schematic diagram of a second embodiment of the charge pump circuit in accordance with the present invention.

FIG. 8 show a charge pump circuit 800 in accordance with another embodiment of the present invention. Charge pump circuit 800 is similar to charge pump circuit 100 (see FIG. 1) with the following exceptions. First, charge pump circuit 800 includes MOS transistors 821 through 828 in place of generalized switches 121 through 128 of charge pump circuit 100. In addition, charge pump circuit 800 includes a control circuit 840 having control lines 841 through 845 connected to the gates of MOS transistors 821 through 828. In particular, control line 841 is connected to the gate of MOS transistors 821, 823 and 824, control line 842 is connected to the gate of MOS transistor 822, control line 843 is connected to the gate of MOS transistor 825, control line 844 is connected to the gate of MOS transistor 826, and control line 845 is connected to the gate of MOS transistors 827 and 828.

In accordance with the present invention, control circuit 840 generates switch control signals which are applied to gates of MOS switches 821 through 828 such that charge pump circuit 800 enters the charging state "a" before each of the refresh states "b" and "c". Control circuit 840 is, for example, a state machine driven by an oscillating clock or an equivalent circuit. Control circuit 840 generates switch control signals such that charge pump circuit 800 enters the operating states "a" "b" and "c" according to the following four-step repeating sequence (1):

(1) a→b→a→c

During a first phase of sequence (1), control circuit 840 generates a first set of control signals which open/close switches 821 through 828 such that charge pump circuit 800 enters the charging state "a", as explained above with reference to FIG. 5. During a second phase of sequence (1), control circuit 840 generates a second set of control signals such that charge pump circuit 800 enters the refresh state "b", as explained above with reference to FIG. 6. During a third phase of sequence (1), control circuit 840 retransmits the first set of control signals such that charge pump circuit 800 enters the charging state "a". Finally, during a fourth phase of sequence (1), control circuit 840 generates a third set of control signals such that charge pump circuit 800 enters the refresh state "c", as explained above with reference to FIG. 7. Following the fourth phase, control circuit 840 returns to the first phase (that is, sequence (1) is repeated).

In accordance with operating of charge pump circuit 800 using sequence (1), transfer capacitors 111 and 112 are charged after each refresh state "b" and "c", thereby assuring a uniform voltage magnitude at the non-inverted and inverted output terminals 103 and 104 of charge pump circuit 800.

One of ordinary skill in the art will recognize that charge pump circuit 800 is not limited to operating sequence (1). For example, when the loads applied to the non-inverted and inverted output terminals 103 and 104 are relatively low, the following operating sequence (2) may be generated by control circuit 840:

(2) a→b→c→a→c→b

The first two phases of sequence (2) are identical to those of sequence (1). However, instead of repeating charging state "a" in the third phase, control circuit 840 generates a third set of control signals such that charge pump circuit 800 enters the refresh state "c". Thus, sequence (2) allows for more frequent refreshing of reservoir capacitors 113 and 114 by omitting the charging step "a" between refreshing steps "b" and "c", thereby reducing signal degradation at non-inverting and inverting output terminals 103 and 104.

Sequence (2) then continues with a fourth phase in which control circuit 840 causes charge pump circuit 800 to enter the charging state "a". Then, in contrast to the second phase, during the fifth phase control circuit 840 causes charge pump circuit 800 to enter the refresh state "c". That is, instead of entering refresh state "b" after the charging state "a" of the fourth phase, charge pump circuit 800 enters refresh state "c" during the fifth state of sequence (2). Finally, during the sixth phase of sequence (2), control circuit 840 causes charge pump circuit 800 to enter the refresh state "b". Because the refresh states "b" and "c", which follow the charging states "a" of the first and fourth phases, are alternated in sequence (2), voltage level magnitudes at the reservoir capacitors are normalized (averaged).

The present invention should not be limited to the above-described operating sequences (1) and (2). The order of the operating states "a", "b" and "c" can be optimized for a particular application, the maximum available bandwidth of the particular fabrication process used to produce the charge pump circuit, the supply voltage, the size and type of the capacitors of the charge pump circuit and the load conditions. For example, any of the following repeating sequences (3) through (6) may be used:

(3) a→c→b
(4) a→b→c
(5) a→c→b→c→b
(6) a→b→c→b→c.

One of ordinary skill in the art will recognize that the amount of current which may be drawn from the non-inverted output terminal 103 and the inverted output terminal 104 depends on the relative sizes of the capacitors and the impedance of the switches 821 through 828. One of ordinary skill in the art will also recognize that it takes several cycles before the non-inverted terminal 103 and the inverted terminal 104 reach +2 Vin and −2 Vin, respectively.

Although the present invention has been described in considerable with reference to certain preferred versions thereof, other versions are possible. For example, the series connections of first and second transfer capacitors 111 and 112 during states "b" and "c" may be periodically reversed. That is, transfer capacitor 111 may be connected to non-inverting output terminal 103 and transfer capacitor 112 connected to ground during every other state "b" of a sequence (1). By switching the series connection of the transfer capacitors 111 and 112, it is possible to reduce the effect of charge transfer errors due the capacitances of the reservoir capacitors and parasitic resistance mismatches. Further, one of ordinary skill in the art will recognize that bipolar voltage levels greater than ±2 Vin may be obtained using the teachings of the present invention by increasing the number of transfer capacitors. Moreover, the switches of the charge pump circuit are not limited to MOS devices-any appropriate switching device may be used. Therefore, the spirit and skill of the appended claim should not be limited to the description of the preferred versions contained herein.

We claim:

1. A circuit for providing bipolar voltage output having a magnitude which is multiple times that of a unipolar voltage source, comprising:

a first capacitor having a first terminal and a second terminal;

a second capacitor having a first terminal and a second terminal;

a first switch connected between the first terminal of the first capacitor and the unipolar voltage source;

a second switch connected between the first terminal of the second capacitor and the unipolar voltage source;

a third switch connected between the second terminal of the first capacitor and the ground potential;

a fourth switch connected between the second terminal of the second capacitor and the ground potential; and a fifth switch;

wherein a first node is located between the first terminal of the first capacitor and the first switch, and a second node is located between the second terminal of the second capacitor and the fourth switch; and wherein the first node is connectable to the second node through the fifth switch.

2. The circuit of claim 1 further comprising a control circuit connected to control terminals of the first, second, third, fourth and fifth switches, the control circuit transmitting a set of control signals to the control terminals such that the first, second, third and fourth switches are closed and the fifth switch is opened, thereby charging the first and second capacitors to a voltage level of the unipolar voltage source.

3. The circuit of claim 1 wherein a third node is located between the first terminal of the second capacitor and the second switch, and the circuit further comprises:

a third capacitor having a first terminal and a second terminal, the second terminal being connected to ground; and a seventh switch connected between the first terminal of the third capacitor and the third node.

4. The circuit of claim 3 further comprising a control circuit connected to control terminals of the first, second, third, fourth, fifth, and seventh switches, the control circuit transmitting a set of control signals to the control terminals such that the first, second and fourth switches are opened and the third, fifth and seventh switches are closed, thereby connecting the first and second capacitors in series such that a voltage level equal to two times the unipolar voltage source is applied to the third capacitor.

5. The circuit of claim 3 wherein a fourth node is located between the second terminal of the first capacitor and the third switch, and the circuit further comprises:

a sixth switch connected between the third node and ground;

a fourth capacitor having a first terminal and a second terminal, the second terminal being connected to ground; and an eighth switch connected between the first terminal of the fourth capacitor and the fourth node.

6. The circuit of claim 5, wherein the control circuit is also connected to control terminals of the sixth and eighth switches, the control circuit transmitting a second set of control signals such that the first, second, third, fourth and seventh switches are opened and the fifth, sixth and eighth switches are closed, thereby connecting the first and second capacitors in series such that a negative voltage level equal to two times a magnitude of the unipolar voltage source is applied to the fourth capacitor.

7. A method of generating a bipolar output voltage having a magnitude which is multiple times a voltage level of a unipolar input supply, the method comprising the steps of:

charging first and second transfer capacitors to the voltage level of the unipolar input supply;

connecting the first and second capacitors in a first series arrangement and to a first reservoir capacitor such that a positive voltage equal to multiple times the voltage level of the unipolar input supply is applied to the first reservoir capacitor; and connecting the first and second capacitors in a second series arrangement and to a second reservoir capacitor such that a negative voltage equal to multiple times the voltage level of the unipolar input supply is applied to the second reservoir capacitor.

8. The method of claim 7, further comprising a step of charging the first and second capacitors to the voltage level of the unipolar input supply between the steps of connecting the first and second capacitors in the first series arrangement and the step of connecting the first and second capacitors in the second series arrangement.

9. A method of generating a bipolar output voltage having a magnitude which is multiple times a voltage level of a unipolar input supply, the method comprising the steps of:

charging first and second transfer capacitors to the voltage level of the unipolar input supply;

connecting the first and second capacitors in a first series arrangement and to a first reservoir capacitor such that a negative voltage equal to multiple times the voltage level of the unipolar input supply is applied to the first reservoir capacitor; and connecting the first and second capacitors in a second series arrangement and to a second reservoir capacitor such that a positive voltage equal to multiple times the voltage level of the unipolar input supply is applied to the second reservoir capacitor.

10. The method of claim 9, further comprising a step of charging the first and second capacitors to the voltage level of the unipolar input supply between the steps of connecting the first and second capacitors in the first series arrangement and the step of connecting the first and second capacitors in the second series arrangement.

* * * * *